United States Patent [19]

Morero et al.

[11] 3,929,978

[45] Dec. 30, 1975

[54] PROCESS FOR PREPARING FERROMAGNETIC CHROMIUM DIOXIDE

[75] Inventors: Domenico Morero, Merano; Ugo Montiglio, Alessandria; Pierfrancesco Aspes, Alessandria; Giampiero Basile, Alessandria, all of Italy

[73] Assignee: Montecatini Edison S.p.A., Milan, Italy

[22] Filed: Mar. 1, 1972

[21] Appl. No.: 231,028

[30] Foreign Application Priority Data

Mar. 4, 1971 Italy .................................. 21316/71

[52] U.S. Cl. .............. 423/607; 252/62.51; 423/595

[51] Int. Cl.[2] ........................................... C01G 37/02

[58] Field of Search ........................ 423/607; 23/145; 252/62.51

[56] References Cited

UNITED STATES PATENTS

| | | | |
|---|---|---|---|
| 3,117,093 | 1/1964 | Arthur, Jr. et al. | 252/62.51 |
| 3,451,771 | 6/1969 | Cox et al. | 423/607 |
| 3,486,851 | 12/1969 | Hicks | 252/62.51 |

*Primary Examiner*—Herbert T. Carter
*Attorney, Agent, or Firm*—Stevens, Davis, Miller & Mosher

[57] ABSTRACT

Ferromagnetic chromium dioxide is formed by heating a hydrated chromium (III) chromate of the formula $Cr_2(CrO_4)_3.nH_2O$ wherein $n$ varies between 1 to 8 at a temperature ranging from 250° to 500°C under an oxygen pressure of 30 to 1000 atmospheres. The resulting product is pure, without modifiers, and has magnetic characteristics which makes it very suitable for use in magnetic recording applications.

4 Claims, No Drawings

PROCESS FOR PREPARING FERROMAGNETIC CHROMIUM DIOXIDE

The present invention relates to a method for preparing ferromagnetic chromium dioxide of high magnetic characteristics. Ferromagnetic chromium dioxide is employed in various sections in the field of magnetic recording, such as for magnetic tapes for audio and visual recording, recording tapes and magnetic memories for computers, in magnetic discs and cards, and the like.

In some of the applications, for instance in video-magnetic appliances and in computer tapes, it is required that the chromium dioxide shall have specific magnetic characteristics, that is, that it shall have a coercive force of at least 300 Oe, a saturation magnetization as high as possible, and a residual magnetization/saturation magnetization ratio greater than 0.40; and besides that it shall be formed of oblong particles with a length as uniform as possible.

Various methods are known to those skilled in the art for obtaining chromium dioxide through heating of $CrO_3$ or by thermal decomposition of $CrO_2Cl_2$ (chromyl chloride). In general, however, one only obtains an impure product because of the presence of other chromium oxides.

The thermal decomposition of chromic anhydride under high pressures has enabled one to obtain a very pure $CrO_2$ but of poor magnetic characteristics; more particularly, the coercive force proves to be below 200 Oersted while the particles are non-homogeneous and only slightly elongated and, thus, are unsuited for practical use.

A chromium dioxide of good magnetic characteristics is obtained by precipitating from a trivalent chromium solution a hydrated chromium oxide, by calcining the latter at temperatures above 200°C, and then by oxidizing the thus-obtained product with a suitable oxidizer (i.e. chromic anhydride, oxygen, hydrogen peroxide) at temperatures of more than 250°C and under pressure greater than 50 atmospheres. This process, however, is quite burdensome and laborious because of the many operational stages it requires while the results are not always repeatable.

According to an earlier application (Aspes et al. Ser. No. 51,661, filed July 1, 1970) it is possible to prepare a chromium dioxide of good magnetic characteristics simply by heating $CrO_3$ in the presence of seeds consisting of crystals isomorphic with $CrO_2$, such as for instance $TiO_2$, or also non-isomorphic crystals such as antimony oxides of particularly fine granulometry. In this case, however, the presence of elements other than chromium in the crystal lattice of the industrial product reduces the saturation magnetization of the resulting $CrO_2$.

According to still another earlier application (Basile et al. Ser. No. 154,172, filed July 17, 1971) one may obtain pure $CrO_2$ having, moreover, good magnetic characteristics by oxidizing chromium metal of particularly fine granulometry by means of $CrO_3$, at temperatures between 300° and 500°C and under pressures of from 5–300 atm. The preparation of the starting chromium metal as well as its subsequent oxidation with $CrO_3$ require, however, particular care and attention in order to obtain a controlled and repeatable reaction.

Thus, an object of the present invention is that of preparing a pure chromium dioxide, free of modifiers, and having magnetic characteristics particularly suitable for use in the field of magnetic recording.

Another object of the invention is that of providing a simple process easy to carry out for the preparation of ferro-magnetic chromium.

A still further object is that of providing a chromium dioxide having a very uniform granulometry.

These and other objects are achieved, according to this invention, if hydrated chromium (III) chromate (of the formula: $Cr_2(CrO_4)_3.nH_2O$, wherein $n$ may vary from 1 to 8) is converted into $CrO_2$ by heating at temperatures between 250° and 500°C and under an oxygen pressure of between 30 and 1000 atm.

The chromium (III) chromate that serves as starting material may easily be obtained through simple chemical reactions long since described in the prior art literature (for a full survey see for instance Gmelins Handbuch der anorganischen Chemie, Verlag Chemie (1962), 8th edition, Chrom Teil B, pages 104–105).

One of the simplest methods consists in reducing chromic acid solutions with methyl alcohol or formaldehyde, until attaining in the solution a $Cr^{6+}/Cr^{3+}$ ratio of 1.5, corresponding to the formula: $Cr_2(CrO_4)_3$. This solution is then slowly evaporated to dryness at a low temperature, and if desired under vacuum.

The chromium (III) chromate may also be obtained by treating chromic acid solutions with the addition of the stoichiometric quantity of freshly precipitated chromium (III) hydrate, and by then slowly evaporating the solution under vacuum to obtain a dry product.

Still another method is to add silver chromate to a concentrated solution of $CrCl_3$, filtering the silver chloride that is formed, and then evaporating the solution until a dark brown, glassy-looking mass is obtained.

The chromium (III) chromate is obtained from the above-described reactions in an amorphous state and it retains a quantity of water that varies, depending on the method of preparation, from a minimum of about 1 mole of water per mole of $Cr_2(CrO_4)_3$ up to 12 moles or more of water.

Although chromium chromates containing considerable quantities of water may be just as usable for the preparation of chromium dioxide, in general it is preferred not to exceed a water content corresponding to about 8 moles of water per mole of $Cr_2(CrO_4)_3$, inasmuch as by operating with greater quantities of water the end product may turn out to be contaminated by CrOOH, which latter forms as a separate phase or goes to coat the $CrO_2$ particles thereby reducing the magnetic yield. Particularly satisfactory results are achieved with hydrated chromium chromate containing from 1 to 4 moles of water as the starting material.

Chromium (III) chromate is a compound of the saline type, soluble in cold water and much faster in hot water. The speed of dissolution is higher in those preparations in which the end compound retains a greater number of moles of water.

This chromium (III) chromate compound turns out to be amorphous under the X-rays and its I.R. spectrum shows a wide absorption band that starts at $9.5\mu$ with a maximum of $10.5\mu$ and extending up to $15\mu$.

On examining the measure of the magnetic susceptivity with respect to temperature, one will obtain an actual magnetic moment of 3.5 magnetones of Bohr (at 20°C), a value which proves to be in agreement with the paramagnetic $Cr^{3+}$ ions which weakly interact with the surrounding diamagnetic groups ($H_2O$, $CrO_4^{--}$).

The preferred temperature at which the chromium (III) chromate is converted into $CrO_2$ is within the range of from 300° to 350°C.

The pressure is preferably maintained between 200 and 350 atm.; one may, however, drop below 200 atmospheres down to a minimum of 30 atm. Greater pressures even exceeding 1000 atm., although leading to the desired chromium dioxide, prove to be economically burdensome.

The reaction time may be varied within rather wide limits, for instance from 20 minutes to 10 hours and more, at the final temperature. Since the $CrO_2$ that is formed is stable within the range of pressures and reaction temperatures indicated, and since the conversion of the chromium chromate to $CrO_2$ is rather fast, the reaction time is not at all critical.

The hydrated chromium (III) chromate is converted to $CrO_2$ by heating in any suitable equipment of which a specific type will not be described by way of example:

This apparatus consists essentially of an autoclave made of stainless steel or any other suitable material, in which autoclave, before starting the reaction, there is introduced the hydrated chromium (III) chromate starting material.

The autoclave is provided with a valve which, if desired, allows the oxygen that forms during the reaction to be discharged, so that the pressure may always be kept at a constant value. The autoclave has a second valve for creating before the start of the reaction the desired pressure of oxygen by means of an external source of oxygen and, to complete the whole, there is also provided a pressure-gauge for measuring and controlling the pressure within the reaction zone.

A thermocouple inserted into the reaction mass allows one to follow on a conventional recorder the variations in the internal temperature with respect to time.

The autoclave, after being charged with the hydrated chromium (III) chromate, is then heated up in a suitably sized muffle furnace or in a heating chamber with circulating hot gases, or by means of other equivalent systems. The temperature attained inside the autoclave at the end of the reaction is preferably between 300° and 350°C, although lower temperatures down to 250°C, or higher temperatures of up to 500°C, will also give the desired chromium dioxide.

The characterization of the chromium dioxide products obtained was carried out in the following way:

by means of an X-ray diffractionmeter, inasmuch as the $CrO_2$ has a characteristic diffraction spectrum whose main reflections, exploited for the qualitative and quantitative analyses, are:

| | | |
|---|---|---|
| d = 3.11 A | relative intensity | = abt. 100 |
| d = 1.63 A | " | = abt. 75 |
| d = 2.42 A | " | = abt. 60 |

by means of an electron microscope, for instance of 20,000 magnification which allows one to define the size, shape and granulometric distribution of the chromium dioxide particles obtained;

through the evaluation of the following magnetic characteristics: saturation magnetization ($\sigma_s$), residual magnetization ($\sigma_r$) and coercitive force ($H_c$), respectively expressed in electromagnetic units/gram for the first two and in Oersted for the third.

The ferromagnetic chromium dioxide obtained according to this invention crystallizes in the tetragonal crystal system of the rutile type and consists of elongated crystals having a length/width ratio of between 3:1 and 20:1, of which at least 90 percent have a length below 1$\mu$.

The coercitive force ($H_C$) may reach 450 Oersted; the magnetization saturation ($\sigma_s$) is greater than 80 e.m.u./g; the residual magnetization ($\sigma_r$) is greater than 30 e.m.u./g and the $\sigma_r/\sigma_s$ ratio is at least 0.4.

In order still more clearly to illustrate the inventive idea of this invention a number of non-limiting examples are given below:

EXAMPLE 1

Chromium (III) chromate was prepared for use as starting material for obtaining $CrO_2$ by proceeding in the following manner:

2000 g of $CrO_3$ were dissolved in distilled water, bringing the volume of the solution up to 4 liters. This solution was then placed into a four-necked 10 liter flask fitted with a stirrer, a reflux condenser, and a thermometer.

To the solution was then added dropwise 160 cc of $CH_3OH$ and the whole was brought to the boiling point, leaving it boiling for about 6 hours up to the complete reaction of the alcohol that is converted to $CO_2$. Thereupon 10 cc of the solution were drawn off, on which was then determined by means of iodometric titration of the hexavalent chromium the $Cr^{6+}/Cr^{3+}$ ratio and the determination of the total chromium was carried out after oxidation with $Na_2O_2$. The ratio thus found amounted to 1.5.

In a dryer under vacuum, 500 cc of the thus-obtained solution were then evaporated for 48 hours at 80°C. In this way a dark brown mass of a glassy aspect was obtained, which was carefully ground to a granulometric size between 1–10$\mu$, and on which was again determined the $Cr^{6+}/Cr^{3+}$ ratio which proved to be unvaried with respect to the value of 1.5 existing in the solution which was evaporated.

The water content turned out to be 10.7 percent, a value that corresponds to 3 moles of water per mole of $Cr_2(CrO_4)_3$.

The hydrated chromium (III) chromate thus obtained proved to be amorphous under X-ray analysis, while under I.R. analysis it showed a wide absorption band that starts at 9.5$\mu$, shows a peak at 10.5$\mu$ and extends up to 15$\mu$.

Thereupon, 112 grams of this hydrated chromium (III) chromate were placed into a titanium test tube having a holding capacity of 130 ml. This container was then placed into an autoclave of the previously described type, made of stainless steel and with an inside volume of 240 ml.

The autoclave was then heated up in a muffle oven which is stabilized at a temperature of 380°C.

Before starting the test, a pressure of 85 atmospheres was created by means of an oxygen flask. The pressure inside the autoclave rose then during the heating owing to the action of the oxygen that forms from the reaction of the water that is freed and due to the thermal expansion of the gas.

After 4 hours inside the autoclave a temperature of 350°C is reached while the pressure has risen to 312 atm. These conditions were then maintained for 1 hour and 20 minutes. The heating was thereupon stopped and, after cooling down, the pressure was relieved and the autoclave opened.

It was found that there had formed in the container a black powder which, once removed, was ground in a ball mill, then washed with water until the wash waters were clear, and thereupon dried in an oven.

The difractogram of the X-ray analysis showed that the product consisted totally of $CrO_2$. Under the electron scanning microscope it appeared to consist of very homogeneous elongated particles in which the length/width ratio was between 3:1 and 10:1. The length of the particles varied from 0.1 to 0.6$\mu$, with 90 percent of the particles being between 0.2 and 0.4$\mu$.

The magnetic characteristics were the following:

coercitive force $H_c$ = 335 Oersted saturation magnetization $\sigma_s$ = 86 Gauss cm$^3$/g residual magnetization/saturation magnetization ratio $\sigma_r/\sigma_s$ = 0.48.

EXAMPLE 2

500 cc of the solution prepared according to the process described in Example 1 were evaporated to dryness on an electrically heated plate, until a dark brown mass showing a content in water of 13.5 percent was obtained.

On this mass was then determined the $Cr^{6+}/Cr^{3+}$ ratio which proved to be unvaried with respect to the value of 1.5 existing in the solution subjected to evaporation.

The mass proved to be amorphous under the X-rays and upon I.R. analysis showed an absorption band similar to that of the hydrated chromium (III) chromate of Example 1.

106 g of this product, placed into a test tube, were then introduced into the previsouly-described autoclave wherein an oxygen pressure of 85 atm is built up and which is heated in a muffle oven set to a temperature of 380°C.

After 4 hours and 15 minutes, a temperature of 350°C was reached inside the autoclave while the pressure attained 290 atm. These conditions were maintained for 1 hour and 15 minutes.

The product thus obtained, after cooling down, grinding and washing according to the procedures indicated previously, was subjected to X-ray analysis and proved to be formed completely of $CrO_2$.

Under the electron microscope the product appears to consist of homogeneous particles of elongated shape; the length/width ratio of the single particles is between 3:1 and 8:1. The length of the particles varied from 0.1 to 0.7$\mu$, with 90 percent of the particles being between 0.2 and 0.5$\mu$. The magnetic characteristics were:

$H_c$ = 320 Oe $\sigma_s$ = 87 Gauss cm$^3$/g $\sigma_r/\sigma_s$ = 0.45

EXAMPLE 3

500 cc of the solution prepared according to the process described in Example 1 were evaporated to dryness on an electrically heated plate, until a mass was obtained of a dark brown color and having a water content of 20 percent.

The $Cr^{6+}/Cr^{3+}$ ratio proved to be 1.5; under X-ray examination this mass was shown to be amorphous, while under I.R. analysis it showed an absorption band similar to that of the hydrated chromium (III) chromate of Example 1.

125 g of the product, placed into a test tube, were introduced into the previously-described autoclave in which there was created an initial oxygen pressure of 30 atm. and which was heated up in a muffle oven to a temperature of 380°C.

Once the pressure of 55 atm. is reached, it was maintained constant until the end of the reaction, discharging the excess from time to time as it forms, through the exhaust valve.

After 2 hours and 45 minutes, a temperature of 350°C is attained in the autoclave which is then maintained for 2 hours.

The product obtained after cooling down, grinding and washing carried out according to the procedures previously indicated, was then examined under the X-rays and showed to consist entirely of $CrO_2$.

Under the electron microscope is appeared to consist of prevailingly oblong-shaped particles with a length/width ratio of the single particles of between 2:1 and 4:1, the length of the particles varying from 0.1 to 1$\mu$ with 90 percent of them being between 0.2 and 0.8$\mu$.

The magnetic values found were:

$H_C$ = 150 Oe $\sigma_s$ = 88 Gauss cm$^3$/g $\sigma_r/\sigma_s$ = 0.4

EXAMPLE 4

8 liters of solution were prepared that contained trivalent chromium chromate, following the same procedures described above in Example 1. This solution was then dried in a spray-drier having a holding capacity of 1 cubic meter, in which drier the temperature of the inflowing air was 480°C while the outflowing air was at a temperature of 150°C.

A brown-blackish powder was thus obtained which contained 12.3 percent of water.

The $Cr^{6+}/Cr^{3+}$ ratio turned out to be equal to 1.5. Under X-ray examination the powder proved to be amorphous, while upon I.R. analysis it showed the identical absorption band of the hydrated chromium (III) chromate of Example 1.

100 grams of this hydrated chromium (III) chromate, placed into a test tube, were then introduced into the previously-described autoclave, in which latter there is created a starting pressure of 85 atm. while the autoclave is heated in a muffle oven set at 380°C.

After 3 hours and 45 minutes, a temperature of 350°C is attained inside the autoclave while the pressure will have risen to 280 atm. These conditions of temperature and pressure were maintained unaltered for 1 hour and 10 minutes.

The product obtained after cooling down, grinding and washing carried out according to the procedures already described, was then examined under X-rays and found to consist of pure $CrO_2$.

Under the electron microscope the product appears to consist of very homogeneous and needle-shaped particles in which the length/width ratio of the individual particles is between 5:1 and 15:1. The length of the particles varied between 0.2 and 0.8$\mu$ with 90 percent of them being between 0.4 and 0.7$\mu$. The magnetic characteristics turned out to be as follows:

$H_C$ = 350 Oe $\sigma_s$ = 85 Gauss cm$^3$/g $\sigma_r/\sigma_s$ = 0.46

We claim:

1. A process for preparing high quality ferromagnetic chromium dioxide consisting of heating a chromium (III) chromate salt of the formula $Cr_2(CrO_4)_3 \cdot nH_2O$ wherein $n$ is from 1 to 8 at a temperature between 250° and 500°C under an oxygen pressure between 30 and 1000 atmospheres.

2. The process according to claim 1, wherein the heating temperature is between 300° and 350°C.

3. The process according to claim 1, wherein the oxygen pressure is between 200 and 350 atm.

4. The process according to claim 1, wherein the hydrated chromium (III) chromate starting material contains from 1 to 4 moles of water.

* * * * *